United States Patent
Harashima (10) Patent No.: US 10,704,700 B2
(45) Date of Patent: Jul. 7, 2020

(54) CHECK VALVE STRUCTURE

(71) Applicant: FUJIKURA COMPOSITES INC., Tokyo (JP)

(72) Inventor: Nobuyasu Harashima, Tokyo (JP)

(73) Assignee: FUJIKURA COMPOSITES INC., Tokyo (JP)

( * ) Notice: Subject to any disclaimer, the term of this patent is extended or adjusted under 35 U.S.C. 154(b) by 14 days.

(21) Appl. No.: 16/070,663

(22) PCT Filed: Apr. 6, 2016

(86) PCT No.: PCT/JP2016/061269
§ 371 (c)(1),
(2) Date: Jul. 17, 2018

(87) PCT Pub. No.: WO2017/175335
PCT Pub. Date: Oct. 12, 2017

(65) Prior Publication Data
US 2019/0024810 A1 Jan. 24, 2019

(51) Int. Cl.
*F16K 15/14* (2006.01)

(52) U.S. Cl.
CPC .......... *F16K 15/142* (2013.01); *F16K 15/141* (2013.01); *F16K 15/148* (2013.01)

(58) Field of Classification Search
CPC ........ F16K 7/12; F16K 15/141; F16K 15/142; F16K 15/148; F16K 15/202; F16K 15/06;
(Continued)

(56) References Cited

U.S. PATENT DOCUMENTS 3,889,710 A 6/1975 Brost
4,550,749 A * 11/1985 Krikorian ............. F16K 15/148
137/843
(Continued)

FOREIGN PATENT DOCUMENTS

DE 2711387 A1 * 9/1978 ........... F16K 15/141
JP 2009-250363 A 10/2009
(Continued)

OTHER PUBLICATIONS

Jun. 28, 2016 Search Report issued in International Patent Application No. PCT/JP2016/061269.

*Primary Examiner* — Reinaldo Sanchez-Medina
*Assistant Examiner* — Hailey K. Do
(74) *Attorney, Agent, or Firm* — Oliff PLC (57) ABSTRACT

A check valve structure includes: a valve casing communicating with each of inflow and outflow paths for a fluid; and a valve element which is disposed in the valve casing and configured of an elastic material. The valve element has a thin portion, and a thick portion protruding from the substantial center of one surface of the thin portion. The valve casing has: a valve element support portion including an annular bottom portion capable of supporting an outer edge of a bottom portion of the thick portion, and a peripheral wall portion continuing to an outer peripheral edge of the annular bottom portion; and a valve seat portion including a valve element contact portion which is in contact with a vicinity of an outer peripheral edge portion on the other surface side of the thin portion, and a valve seat surface which can be in contact with the thin portion.

8 Claims, 8 Drawing Sheets

(58) Field of Classification Search
CPC ........... Y10T 137/7837; Y10T 137/784; Y10T 137/7843; Y10T 137/7879; Y10T 137/7888; Y10T 137/789

See application file for complete search history.

(56) References Cited

U.S. PATENT DOCUMENTS

| | | | | |
|---|---|---|---|---|
| 5,218,993 | A * | 6/1993 | Steinberg | F16K 15/141 |
| | | | | 137/515.5 |
| 5,431,185 | A * | 7/1995 | Shannon | A61M 39/04 |
| | | | | 137/512.4 |
| 7,438,090 | B2 * | 10/2008 | Steele | F16K 15/141 |
| | | | | 137/854 |

FOREIGN PATENT DOCUMENTS

| | | |
|---|---|---|
| JP | 3173542 U | 2/2012 |
| KR | 10-2013-0116753 A | 10/2013 |
| KR | 20-2015-0001586 U | 4/2015 |

\* cited by examiner

CHECK VALVE STRUCTURE

TECHNICAL FIELD

The present invention relates to a check valve structure to be provided in a flow path for a fluid.

BACKGROUND ART

A check valve structure that is advantageously used for a liquid pump, an oxygen concentrator, a hemodialysis circuit, an infusion circuit and the like, limits the flow of a fluid such as a liquid only in a forward flow direction, and prevents the flow in the reverse flow direction is well known. A so-called umbrella-type valve element, which includes, for example, an umbrella-shaped portion having a substantially circular shape in a plan view and a shaft portion provided substantially at the center of the umbrella-shaped portion, and which is configured of an elastically deformable elastic material (for example, a rubber material such as silicone rubber) is known as a valve element constituting the check valve structure (see PTL 1).

CITATION LIST

Patent Literature

[PTL 1] Japanese Patent Application Publication No. 2009-250363

SUMMARY OF INVENTION

Technical Problem

Figure 10:
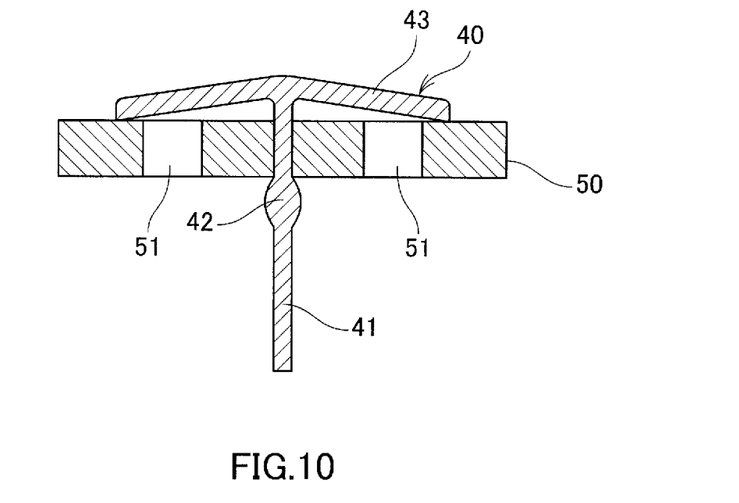
FIG. 10 is a cross-sectional view showing a schematic configuration of the conventional check valve structure having an umbrella-type valve element.

FIG. 10 shows a schematic configuration of a check valve structure using the conventional umbrella-type valve element. As shown in FIG. 10, in the conventional umbrella-type valve element 40, a large-diameter portion 42 is provided in the middle of a shaft portion 41. In the check valve structure using the valve element 40, a valve seat 50, in which a support hole for supporting the shaft portion 41 and a flow path hole 51 through which a fluid passes are formed, is provided in the middle of the flow path of the fluid. Further, by inserting the shaft portion 41 into the support hole of the valve seat 50, the large-diameter portion 42 of the shaft portion 41 is locked in the support hole. As a result, the function of preventing the shaft portion 41 from coming out of the support hole under the action of the pressure force of the fluid in the forward flow direction is fulfilled.

In the conventional umbrella-type valve element 40 having such a configuration, the inner diameter of the support hole into which the shaft portion 41 is inserted is larger than the outer diameter of the large-diameter portion 42. The resulting problem is that the shaft portion 41 is difficult to insert into the support hole. Further, in order to insert the large-diameter portion 42 into the support hole by elastically deforming the large-diameter portion 42, it is necessary to pull the distal end of the shaft portion 41 inserted into the support hole with a strong force. However, a problem arising at this time is that the shaft portion 41 may be disconnected from an umbrella-shaped portion 43. Furthermore, although the umbrella-type valve element 40 is molded using a metal mold, the large-diameter portion 42 provided in the middle of the shaft portion 41 serves as a resistance when the valve element 40 is pulled out from the metal mold, and the shaft portion 41 may be damaged.

In view of such problems, it is an object of the present invention to provide a check valve structure including a valve element that can be easily assembled into a valve casing and is unlikely to be damaged during assembling or molding.

Solution to Problem

In order to solve the above-mentioned problems, the present invention provides a check valve structure including: an inflow path and an outflow path for a fluid; a valve casing communicating with each of the inflow path and the outflow path; and a valve element which is disposed in the valve casing and configured of an elastic material, wherein the valve element has a thin portion having a substantially circular shape in a plan view, and a thick portion protruding from a substantial center of one surface of the thin portion, the valve casing has: a valve element support portion which includes an annular bottom portion having a hole portion continuing to the outflow path in the substantial center and capable of supporting an outer edge of a bottom portion of the thick portion, and a peripheral wall portion continuing to an outer peripheral edge of the annular bottom portion; and a valve seat portion including a valve element contact portion which is in contact with a vicinity of an outer peripheral edge portion on the other surface side of the thin portion, and a valve seat surface which is positioned between the valve element contact portion and an outlet end of the inflow path and can be in contact with the other surface of the thin portion, and under a pressure of the fluid flowing in a forward flow direction from the inflow path to the outflow path, the vicinity of the outer peripheral edge portion on the other surface side of the thin portion deforms elastically so as to separate from the valve element contact portion, thereby opening the valve (Invention 1).

In the abovementioned invention (Invention 1), it is preferable that a thickness of the vicinity of the outer peripheral edge portion of the thin portion which is in contact with the valve element contact portion is 0.1 mm to 1.0 mm (Invention 2).

In the abovementioned inventions (Inventions 1 and 2), it is preferable that in a state where the thick portion is loosely fitted to the center of the valve element support portion, a length from a side wall of the thick portion to the peripheral wall portion of the valve element support portion is less than a length from the valve element contact portion to an end portion of the outer peripheral edge of the thin portion (Invention 3).

In the abovementioned inventions (Inventions 1 to 3), it is preferable that the valve element has a protruding portion that protrudes from the substantial center on the other surface side of the thin portion and can be inserted into and removed from the inflow path (Invention 4).

In the abovementioned inventions (Inventions 1 to 4), it is preferable that a length between a top portion of the peripheral wall portion of the valve element support portion and the outlet end of the inflow path in a cross-sectional view of the valve casing is less than a thickness of the center of the valve element in a plan view (Invention 5).

In the abovementioned inventions (Inventions 1 to 5), it is preferable that the check valve structure further includes an inclined surface extending outwardly from a top portion of the peripheral wall portion of the valve element support portion and that recessed groove portions constituting a flow path toward the outflow path are formed radially around the hole portion of the annular bottom portion, on the inclined surface (Invention 6).

In the abovementioned inventions (Inventions 1 to 6), it is preferable that the valve casing is configured by fitting together a first valve casing having the inflow path and a second valve casing having the outflow path (Invention 7).

Advantageous Effects of Invention

According to the present invention, it is possible to provide a check valve structure including a valve element that can be easily assembled into a valve casing and is unlikely to be damaged during assembling or molding.

DESCRIPTION OF EMBODIMENTS

Hereinafter, embodiments of the present invention will be described with reference to the drawings.

Figure 1:
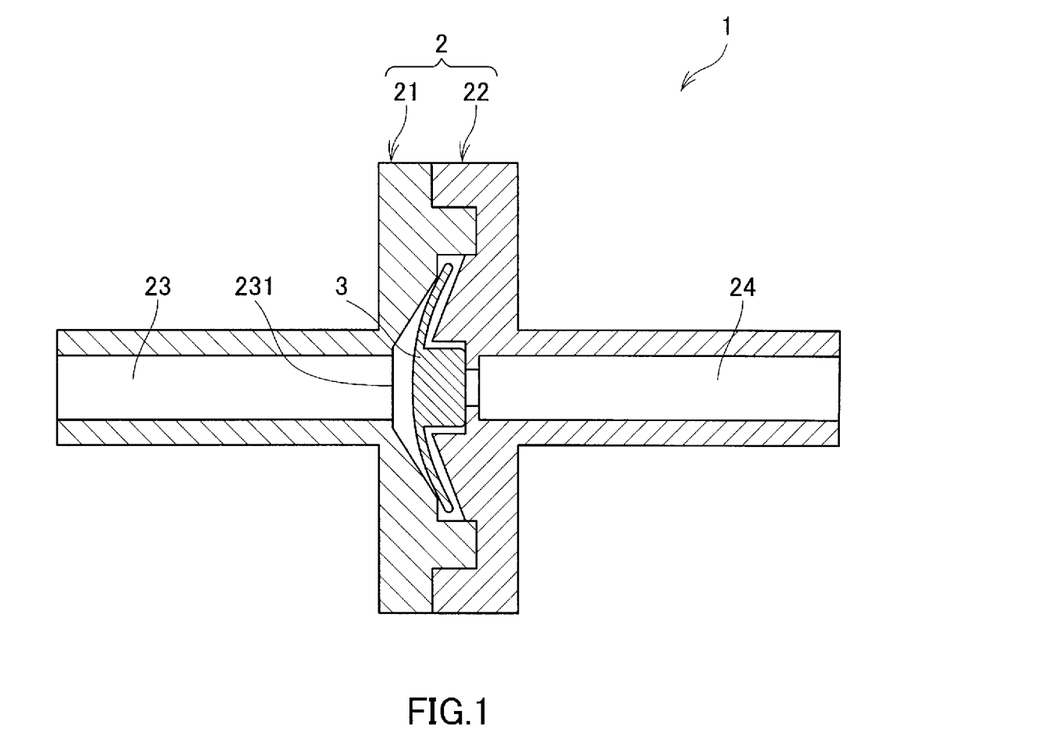
FIG. 1 is a cross-sectional view showing a schematic configuration of a check valve structure according to an embodiment of the present invention.

As shown in FIG. 1, a check valve structure 1 according to the present embodiment includes an inflow path 23, an outflow path 24, a resin valve casing 2 communicating with the inflow path 23 and the outflow path 24, and a valve element 3 disposed in the valve casing 2 and configured of an elastic material.

Figure 2:
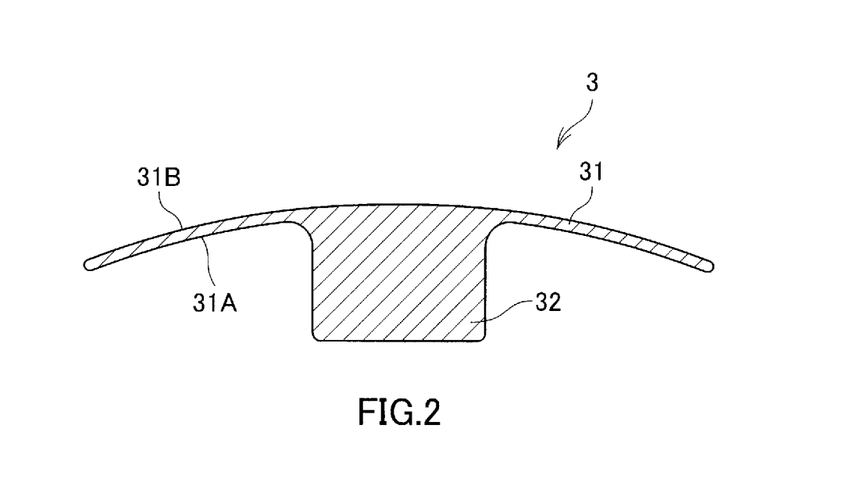
FIG. 2 is a cut end view showing a schematic configuration of a valve element according to an embodiment of the present invention.

As shown in FIG. 2, the valve element 3 has a thin portion 31 having a substantially conical shape (substantially circular shape in a plan view) in a free state (assembled state) and a thick portion 32 having a substantially round columnar shape and protruding from the substantial center on one surface 31A side of the thin portion 31.

The material constituting the valve element 3 is not particularly limited as long as it is an elastic material which can be elastically deformed by the pressure of the fluid flowing in the forward flow direction (rightward direction in FIG. 1). Examples of such materials include synthetic rubbers such as silicone rubber, isoprene rubber, butyl rubber, and the like, thermoplastic elastomers, and the like.

Figure 3:
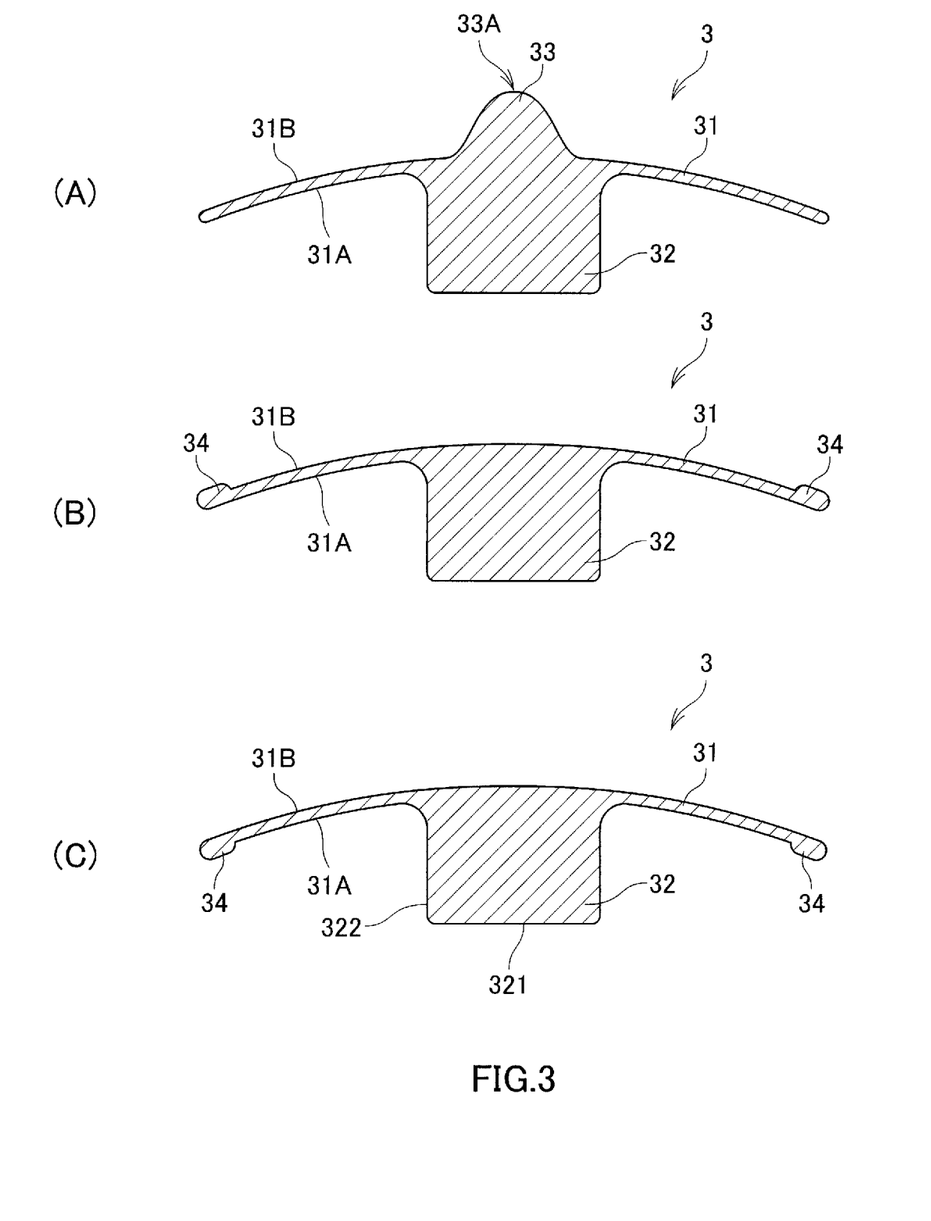
FIGS. 3(A) to 3(C) are cut end views showing another configuration of the valve element according to an embodiment of the present invention.

As shown in FIG. 3(A), the valve element 3 may have a protruding portion 33 protruding from the other surface 31B side of the thin portion 31. Where the valve element 3 is displaced in the direction (longitudinal direction in FIG. 1) orthogonal to the flow direction (lateral direction in FIG. 1), the flow path from the outflow path 24 side to the inflow path 23 side cannot be closed and the check effect may be reduced. However, where the protruding portion 33 is provided, when the valve element 3 is moved to the inflow path 23 side by the pressure of the fluid in the reverse flow direction, the protruding portion 33 enters the inflow path 23. As a result, the displacement of the valve element 3 in a direction (longitudinal direction in FIG. 1) orthogonal to the flow direction (lateral direction in FIG. 1) can be suppressed. In order to exhibit such an effect, the diameter of the protruding portion 33 in a plan view is set less than the inner diameter of the inflow path 23 such that at least a part of the protruding portion 33 including the top portion 33A can enter the inflow path 23.

As shown in FIGS. 3(B) and 3(C), in the valve element 3, the end portion 34 of the outer peripheral edge of the thin portion 31 may be configured to be thicker than other portions of the thin portion 31. When the end portion 34 of the outer peripheral edge of the thin portion 31 is configured to be thicker than other portions, the occurrence of deformation such as wrinkles in the vicinity of the end portion 34 of the outer peripheral edge of the thin portion 31 can be suppressed and a better check effect can be obtained. Further, where the end portion 34 of the outer peripheral edge is deformed by the pressure of the fluid flowing in the forward flow direction, there is a possibility that the end portion 34 will enter the flow path (a recessed groove portion 291 of the second valve casing 22 described hereinbelow), but since the end portion 34 of the outer peripheral edge of the thin portion 31 is configured to be thicker than other portions, it is possible to prevent the end portion 34 of the outer peripheral edge from being deformed and entering into the flow path, and the decrease in flow rate can be prevented.

Figure 4:
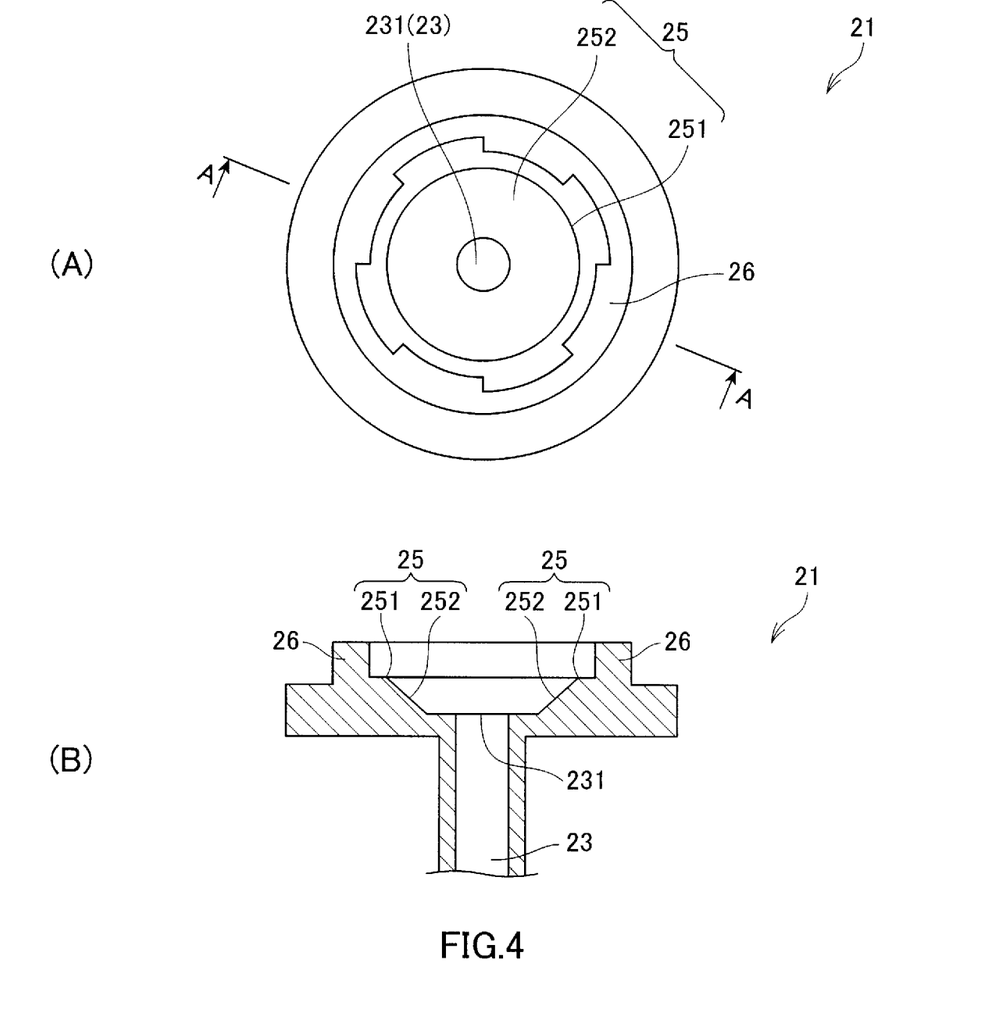
FIG. 4(A) is a plan view showing a first valve casing according to an embodiment of the present invention.
FIG. 4(B) is a sectional view taken along line A-A in FIG. 4(A).

The valve casing 2 has a first valve casing 21 having the inflow path 23 and a second valve casing 22 having the outflow path 24. As shown in FIGS. 4(A) and 4(B), the first valve casing 21 has a valve seat portion 25 extending outwardly from the outlet end 231 of the inflow path 23, and a fitting protruding portion 26. The valve seat portion 25 includes an annular valve element contact portion 251 capable of contacting a vicinity 311 of the outer peripheral edge portion on the other surface 31B side of the thin portion 31 of the valve element 3, and a valve seat surface 252 which is continuous between the annular valve element contact portion 251 and the outlet end 231 of the inflow path 23 and is configured of an inclined surface.

Figure 5:
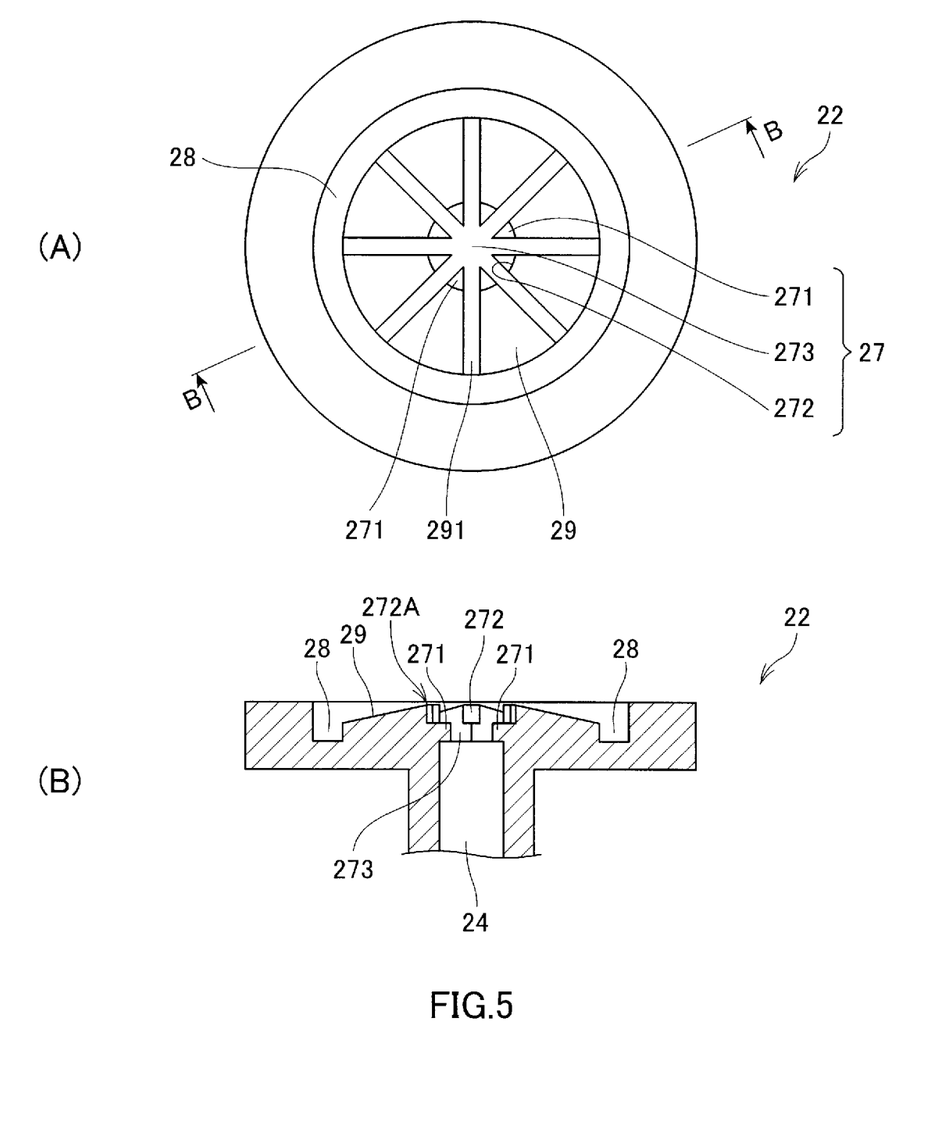
FIG. 5(A) is a plan view showing a second valve casing according to an embodiment of the present invention.
FIG. 5(B) is a sectional view taken along line B-B in FIG. 5(A).

As shown in FIGS. 5(A) and 5(B), the second valve casing 22 has a valve element support portion 27 including a hole portion 273 continuing to the outflow path 24, and a fitting recessed portion 28 corresponding to the fitting protruding portion 26 of the first valve casing 21. The valve casing 2 is configured by fitting together the fitting protruding portion 26 of the first valve casing 21 and the fitting recessed portion 28 of the second valve casing 22.

The valve element support portion 27 has an annular bottom portion 271 which is capable of supporting the outer edge of the bottom portion 321 of the thick portion 32 of the valve element 3 and in which a hole portion 273 is formed substantially in the center, and a peripheral wall portion 272 erected from the outer peripheral edge of the annular bottom portion 271 toward the inflow path 23 side. The valve element support portion 27 is configured to be recessed so that the thick portion 32 of the valve element 3 could be loosely fitted therein. An inclined surface 29 extending outward from the top portion 272A of the peripheral wall portion 272 of the valve element support portion 27 is continuous to the top portion 272A. Further, recessed groove portions 291 are formed radially around the hole portion 273 so as to divide the inclined surface 29 and the annular bottom portion 271 into a plurality of sections. As will be described hereinbelow, under the pressure of the fluid flowing in the forward flow direction, the thin portion 31 of the valve element 3 is elastically deformed and the vicinity 311 of the outer peripheral edge portion of the thin portion 31 separates from the valve element contact portion 251, thereby opening the check valve structure 1 according to the present embodiment. At this time, the one surface 31A side of the thin portion 31 comes into surface contact with the inclined surface 29. However, since the recessed groove portions 291 are formed, the recessed groove portions 291 constitute a flow path, and the fluid flows toward the outflow path 24.

Figure 6:
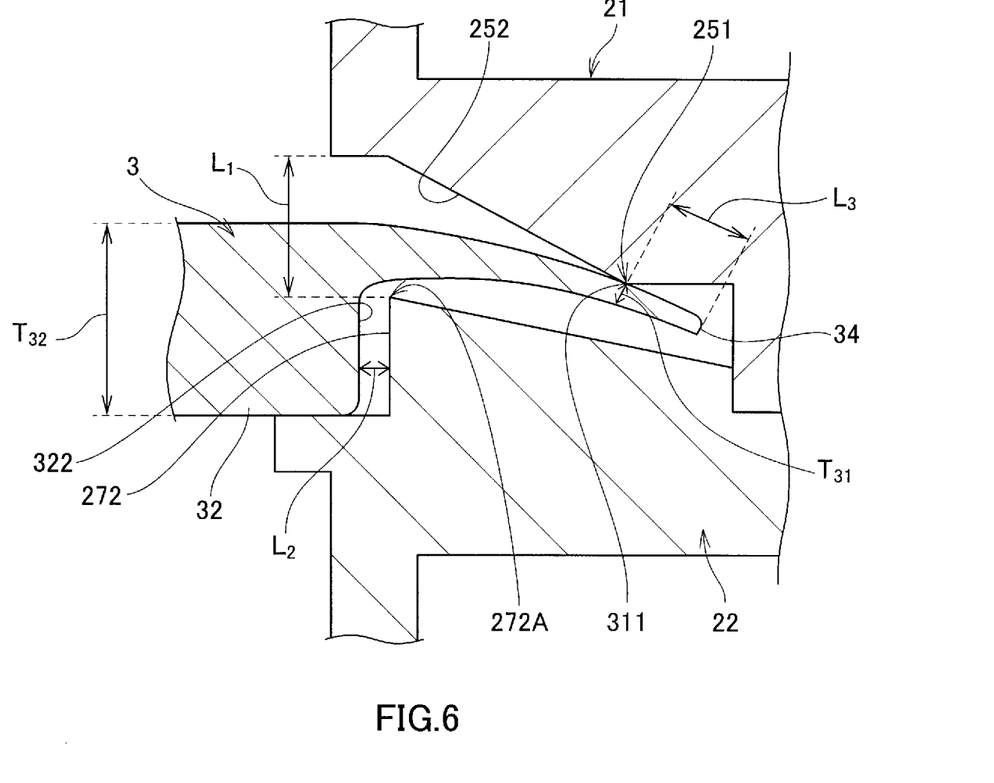
FIG. 6 is a partially enlarged cut end view showing a check valve structure according to an embodiment of the present invention.

As shown in FIG. 6, in a cross-sectional view of the valve casing 2 configured by fitting together the first valve casing 21 and the second valve casing 22, it is preferable that a length $L_1$ between the top portion 272A of the peripheral wall portion 272 of the valve element support portion 27 and the outlet end 231 of the inflow path 23 is less than a thickness $T_{32}$ at the center (thick portion 32) in the plan view of the valve element 3. When the length $L_1$ is less than the thickness $T_{32}$, the displacement of the valve element 3 in the direction (longitudinal direction in FIG. 1) orthogonal to the flow direction (lateral direction in FIG. 1) can be prevented.

Further, it is preferable that in a state where the thick portion 32 is loosely fitted to the center of the valve element support portion 27 in the plan view, a length $L_2$ from a side wall 322 of the thick portion 32 to the peripheral wall portion 272 of the valve element support portion 27 is less than a length $L_3$ from the valve element contact portion 251 to the end portion 34 of the outer peripheral edge of the thin portion 31. As a result, even when the valve element 3 is displaced in a direction (longitudinal direction in FIG. 1) orthogonal to the flow direction (lateral direction in FIG. 1) in a state where the thick portion 32 is loosely fitted to the valve element support portion 27, it is possible to maintain a state where the vicinity 311 of the outer peripheral edge portion of the thin portion 31 is in contact with the valve element contact portion 251, so that the check effect is reliably exhibited.

The thickness $T_{31}$ of the vicinity 311 (the portion in contact with the valve element contact portion 251) of the outer peripheral edge portion of the thin portion 31 of the valve element 3 is preferably 0.1 mm to 1.0 mm, and more preferably 0.1 mm to 0.4 mm. When the thickness $T_{31}$ is less than 0.1 mm, the thin portion 31 is deflected by the pressure of the fluid in the reverse flow direction, a gap appears between the valve element contact portion 251 or the valve seat surface 252 of the valve seat portion 25 and the valve element 3 (thin portion 31), and the fluid may flow backward. Meanwhile, where the thickness $T_{31}$ exceeds 1.0 mm, when the pressure of the fluid in the forward flow direction is low, the thin portion 31 is unlikely to be elastically deformed and the fluid is unlikely to flow in the forward flow direction.

The assembling work of the check valve structure 1 according to the present embodiment having the above-described configuration can be performed as follows. First, the thick portion 32 of the valve element 3 is loosely fitted to the valve element support portion 27 of the second valve casing 22. Since the valve element support portion 27 has a diameter such that the thick portion 32 of the valve element 3 can be loosely fitted, the thick portion 32 of the valve element 3 can be easily loosely fitted to the valve element support portion 27.

Next, the first valve casing 21 and the second valve casing 22 in which the thick portion 32 of the valve element 3 has been loosely fitted to the valve element support portion 27 are fitted by the fitting protruding portion 26 and the fitting recessed portion 28. At this time, the valve element contact portion 251 of the valve seat portion 25 of the first valve casing 21 comes into contact with the vicinity 311 of the outer peripheral edge portion of the thin portion 31 of the valve element 3, and the thin portion 31 is lightly pushed against the second valve casing 22 side. In this manner, the valve element 3 is fixed in the valve casing 2, and the check valve structure 1 is assembled in the valve closed state.

The operation of the check valve structure 1 according to the present embodiment having the above-described configuration will be described below.

The check valve structure 1 according to the present embodiment is installed in a flow path in a hemodialysis circuit, a transfusion circuit, an oxygen concentrator, a fuel supply system of an engine for an automobile or agricultural machine, or the like.

Figure 7:
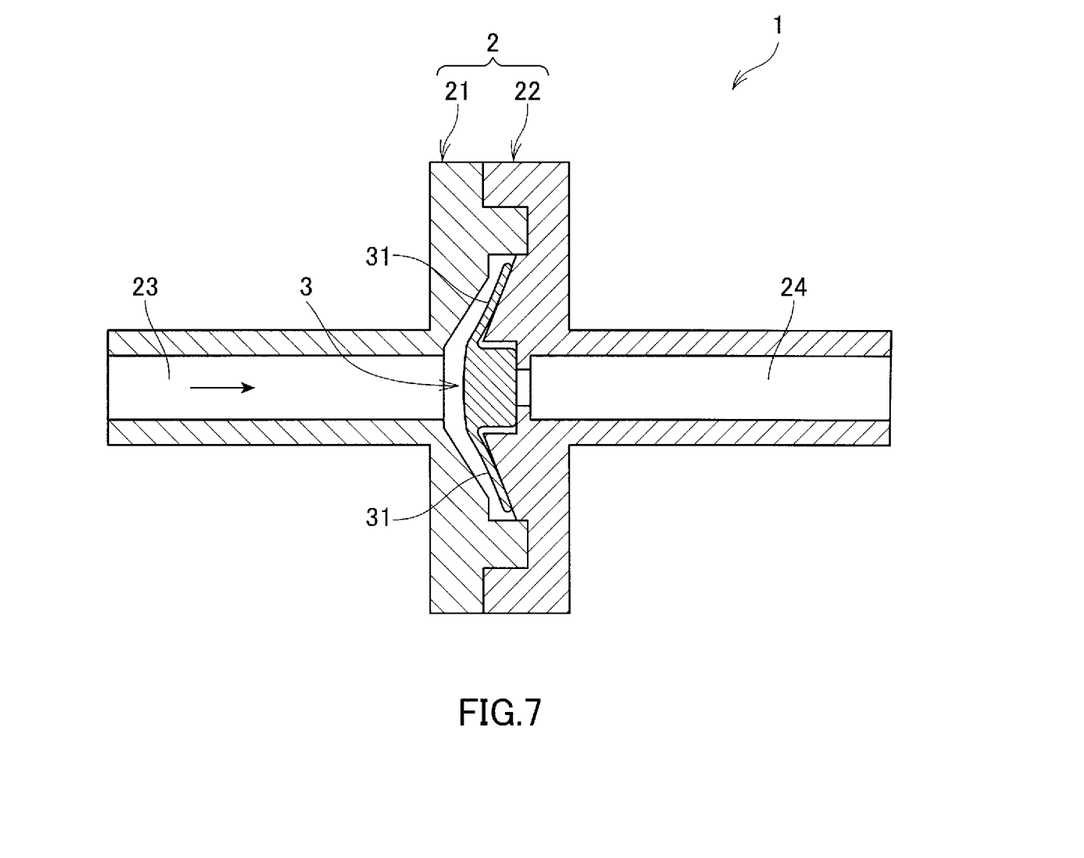
FIG. 7 is a cross-sectional view schematically showing an action realized when a fluid flows in a forward flow direction in a check valve structure according to an embodiment of the present invention.

As shown in FIG. 7, when a fluid flows from the inflow path 23 of the check valve structure 1 toward the outflow path 24 (the direction of the arrow in FIG. 7), the pressure of the fluid elastically deforms the thin portion 31 (in particular, the vicinity 311 of the outer peripheral edge portion of the thin portion 31). In the present embodiment, the thickness $T_{31}$ of the vicinity 311 of the outer peripheral edge portion of the thin portion 31 is about 0.1 mm to 1.0 mm. Therefore, the thin portion 31 (in particular, the vicinity 311 of the outer peripheral edge portion of the thin portion 31) is elastically deformed even when the fluid pressure is low (for example, about 2.0 kPa). As a result, the vicinity 311 of the outer peripheral edge portion of the thin portion 31 that has been in contact with the valve element contact portion 251 in the natural state (assembled state) separates from the valve element contact portion 251, and the fluid flows into a gap between the valve seat portion 25 and the thin portion 31.

At this time, the one surface 31A side of the thin portion 31 of the valve element 3 is in surface contact with the inclined surface 29, but the fluid that has flown into the gap between the valve seat portion 25 and the thin portion 31 flows toward the outflow path 24 in the recessed groove portions 291 continuing to the hole portion 273. Thus, in the check valve structure 1 according to the present embodiment, the flow of the fluid in the forward flow direction is permitted.

Figure 8:
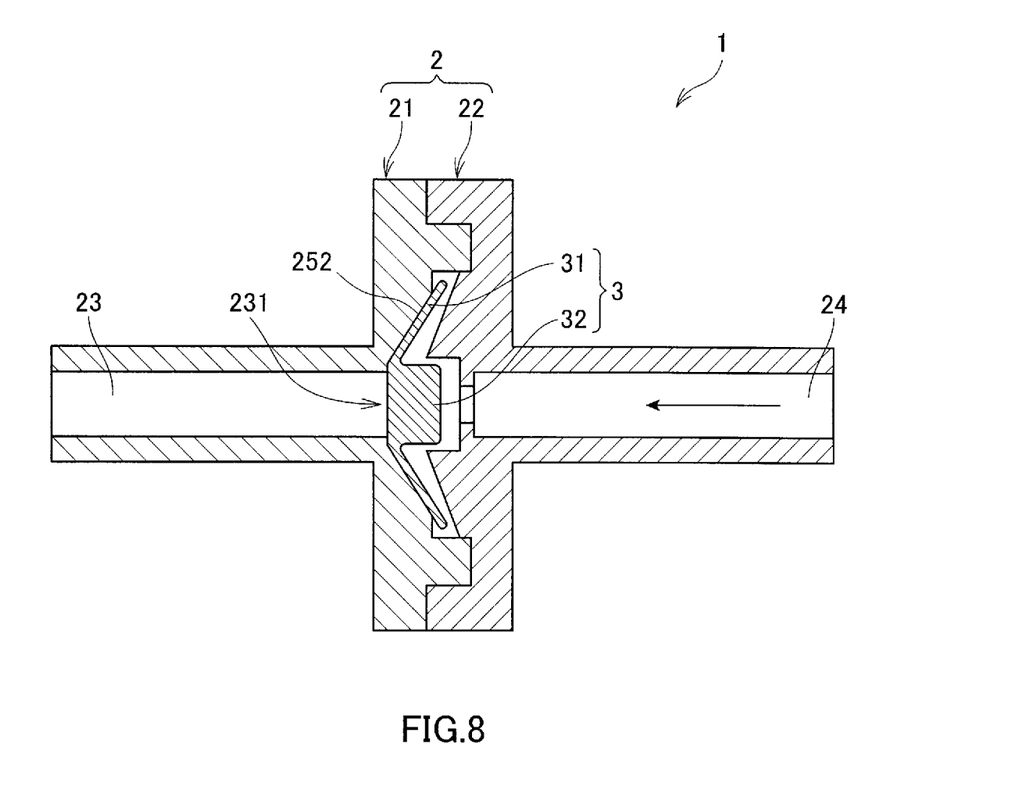
FIG. 8 is a cross-sectional view schematically showing a check action realized when a fluid (high pressure) flows in a reverse flow direction in a check valve structure according to an embodiment of the present invention.

Meanwhile, when the fluid flows from the outflow path 24 of the check valve structure 1 toward the inflow path 23 (in the direction of the arrow in FIG. 8) as shown in FIG. 8, the valve element 3 is moved toward the inflow path 23 by the pressure of the fluid. At this time, where the pressure of the fluid is high (for example, about 15 kPa or more), the thin portion 31 comes into surface contact with the valve seat surface 252, the thick portion 32 is pushed against the outlet end 231 of the inflow path 23, and the outlet end 231 of the inflow path 23 can be closed.

As described above, the valve element 3 according to the present embodiment is configured of an elastic material that can be elastically deformed by the pressure of fluid. Where the valve element 3 according to the present embodiment is a member (disk-shaped valve element) not having the thick portion 32, the valve element may be broken by a large stress applied to the valve element (in particular, the center portion in the plan view of the valve element) by the pressure of the fluid flowing in the reverse flow direction, as also apparent from a test example described hereinbelow. However, since the valve element 3 according to the present embodiment has the thick portion 32, it is possible to reduce the stress applied to the valve element 3 (in particular, the boundary portion between the thin portion 31 and the thick portion 32). Therefore, it is possible to prevent the valve element 3 from being broken.

Figure 9:
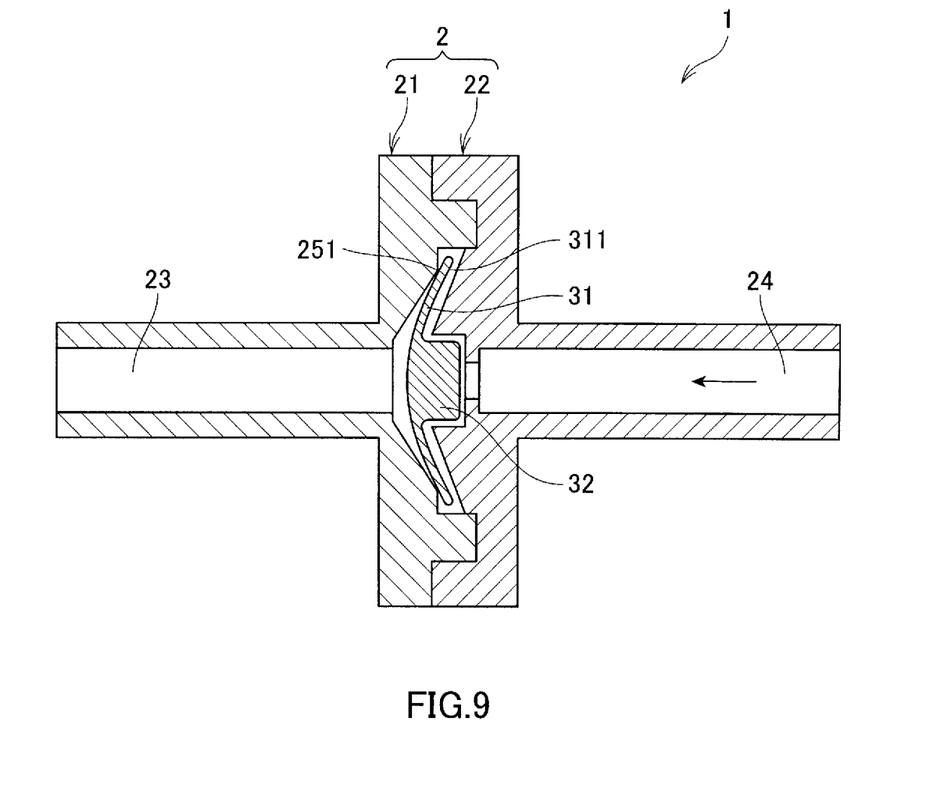
FIG. 9 is a cross-sectional view schematically showing a check action realized when a fluid (low pressure) flows in a reverse flow direction in a check valve structure according to an embodiment of the present invention.

Further, as shown in FIG. 9, when the pressure of the fluid flowing from the outflow path 24 of the check valve structure 1 toward the inflow path 23 (in the direction of the arrow in FIG. 9) is low (for example, 1.0 kPa or less), the valve element 3 slightly moves toward the inflow path 23, but does not move enough to make the thick portion 32 push against the outlet end 231 of the inflow path 23. However, even in such a case, the vicinity 311 of the outer peripheral edge portion of the thin portion 31 is in contact with the valve element contact portion 251, thereby making it possible to close the flow path toward the inflow path 23. In this manner, in the check valve structure 1 according to the present embodiment, the fluid can be effectively stopped regardless of the pressure of the fluid in the reverse flow direction.

As described above, with the check valve structure 1 according to the present embodiment, the valve element 3 has the thin portion 31 and the thick portion 32, and the assembling work is completed by fitting the first valve casing 21 and the second valve casing 22 in a state where the thick portion 32 is loosely fitted to the valve element support portion 27. Therefore, the assembling work can be easily performed. Further, since there is no large-diameter portion for fixing to a valve seat or the like as in the conventional umbrella-type valve element (see FIG. 10), the valve element can be prevented from damage during the assembling work or molding.

Furthermore, with the check valve structure 1 according to the present embodiment, when the reverse fluid pressure is low (for example, about 1.0 kPa or less), the vicinity 311 of the outer peripheral edge portion of the thin portion 31 is in contact with the valve element contact portion 251, and when the reverse fluid pressure is high, the other surface 31B of the thin portion 31 is in surface contact with the valve seat surface 252, whereby a favorable check effect is exerted. Meanwhile, since the thickness $T_{31}$ of the vicinity 311 of the outer peripheral edge portion of the thin portion 31 which is in contact with the valve element contact portion 251 in the natural state is as relatively small as about 0.1 mm to 1.0 mm, the valve can be opened even when the fluid pressure of the fluid in the forward flow direction is low. Therefore, with the check valve structure 1 according to the present embodiment, good responsiveness to the fluid in the forward flow direction can be demonstrated and favorable check effect can be exerted with respect to the fluid in the reverse flow direction.

The above-described embodiments have been described in order to facilitate understanding of the present invention, and these embodiments are not intended to limit the present invention. Therefore, each element disclosed in the embodiments is inclusive of all design changes and equivalents belonging to the technical scope of the present invention.

EXAMPLES

Hereinafter, the present invention will be described in greater detail with reference to examples and the like, but the present invention is not limited at all by the following examples.

Test Example 1

Simulation analysis was performed to evaluate the stress generated in the valve element by the pressure of the fluid in the reverse flow direction with respect to the check valve structure 1 having the configuration shown in FIG. 1 (Example 1) and the check valve structure having the same configuration as the check valve structure 1 of Example 1, except that the valve element 3 did not have the thick portion 32 (Comparative Example 1). The simulation analysis was carried out by a finite element method using nonlinear structure analysis software (product name: MSC Marc, manufactured by MSC Software Corporation), and the elements used were 4-contact axially symmetric solid elements. In the above simulation analysis, a model was used in which the valve element was constituted by a silicone rubber (breaking strength: 10 MPa), and the thickness of the center thereof in the plan view was 1.16 mm (Example 1) and 0.24 mm (Comparative Example 1).

As a result of the above simulation analysis, it was confirmed that in Comparative Example 1, when a pressure of 0.45 MPa was applied, a maximum stress of 10 MPa or more was generated in the center of the valve element in the plan view. Meanwhile, it was confirmed that in Example 1, when a pressure of 0.45 MPa was applied, a maximum stress of 1.2 MPa was generated at the boundary portion between the thin portion 31 and the thick portion 32, and when a pressure of 1 MPa was applied, a maximum stress of 4 MPa was generated in the boundary portion.

As is apparent from the simulation results, with the check valve structure 1 according to the present embodiment, since the valve element 3 has the thick portion 32, it is possible to prevent the valve element 3 from being broken even when the pressure of the fluid in the reverse flow direction is high.

REFERENCE SIGNS LIST

1 Check valve structure
2 Valve casing
21 First valve casing
22 Second valve casing
23 Inflow path
231 Outlet end
24 Outflow path
25 Valve seat portion
27 Valve element support portion
271 Annular bottom portion
272 Peripheral wall portion
273 Hole portion
3 Valve element
31 Thin portion
32 Thick portion

The invention claimed is:
1. A check valve structure comprising:
an inflow path and an outflow path for a fluid;

a valve casing communicating the inflow path with the outflow path; and a valve element disposed in the valve casing and composed of an elastic material, the valve element including (i) a thin portion having a substantially circular shape in a plan view, the thin portion having a first surface positioned at an outflow path side and a second surface positioned at an inflow path side, and (ii) a thick portion protruding from a center of the first surface of the thin portion, wherein:

the valve casing includes:

a valve element support portion shaving an annular bottom portion configured to support an outer edge of a bottom surface of the thick portion without obstructing a fluid flow at a radial center of the annular bottom portion, and a peripheral wall portion extending from an outer peripheral edge of the annular bottom portion; and     a valve seat portion having a valve element contact portion configured to contact with a contact region of an outer peripheral edge portion on the second surface of the thin portion, and a valve seat surface disposed between the valve element contact portion and an outlet end of the inflow path, the valve seat surface being configured to contact the second surface of the thin portion inside of the contact region of the outer peripheral edge portion, a hole portion extends from the radial center of the annular bottom portion to the outflow path, and under a pressure of the fluid flowing from the inflow path to the outflow path, the contact region of the outer peripheral edge portion deforms elastically so as to separate from the check valve structure element contact portion and open the valve.

2. The check valve structure according to claim 1, wherein a thickness of the thin portion at the contact region of the outer peripheral edge portion is 0.1 mm to 1.0 mm.

3. The check valve structure according to claim 1, wherein, when the valve element is centered in the annular bottom portion, a distance between a side wall of the thick portion and the peripheral wall portion of the valve element support portion is less than a distance between the valve element contact portion and an end portion of the outer peripheral edge portion of the thin portion.

4. The check valve structure according to claim 1, wherein the valve element has a protruding portion protruding from a center of the second surface, the protruding portion being configured to be inserted and removed from the inflow path.

5. The check valve structure according to claim 1, wherein in a cross-sectional view of the check valve structure, a distance between a top portion of the peripheral wall portion of the valve element support portion and the outlet end of the inflow path in a cross-sectional view of the valve casing is less than a thickness of the center of the valve element from the bottom surface of the thick portion to the second surface.

6. The check valve structure according to claim 1, further comprising:

an inclined surface extending outwardly from a top portion of the peripheral wall portion of the valve element support portion, and     recessed groove portions forming a plurality of flow paths directed toward the outflow path, the recessed groove portions being formed radially around the hole portion of the annular bottom portion and on the inclined surface.

7. The check valve structure according to claim 1, wherein the valve casing is formed by fitting a first valve casing having the inflow path with a second valve casing having the outflow path.

8. The check valve structure according to claim 1, wherein an outer peripheral edge of the thin portion is thicker than remaining portions of the thin portion.

\* \* \* \* \*